United States Patent
Waligora et al.

(10) Patent No.: US 7,311,360 B2
(45) Date of Patent: Dec. 25, 2007

(54) DEVICE FOR LOCKING THE CONFIGURATION OF EQUIPMENT SUCH AS A VEHICLE SEAT

(75) Inventors: Julien Waligora, Issoudun (FR); Laurent Waligora, Issoudun (FR)

(73) Assignee: Cresystem (FR)

( * ) Notice: Subject to any disclaimer, the term of this patent is extended or adjusted under 35 U.S.C. 154(b) by 113 days.

(21) Appl. No.: 10/531,746

(22) PCT Filed: Oct. 10, 2003

(86) PCT No.: PCT/FR03/02993

§ 371 (c)(1),
(2), (4) Date: Sep. 7, 2005

(87) PCT Pub. No.: WO2004/037601

PCT Pub. Date: May 6, 2004

(65) Prior Publication Data
US 2006/0103212 A1    May 18, 2006

(30) Foreign Application Priority Data
Oct. 18, 2002    (FR)    .................................... 02 12973

(51) Int. Cl.
*B60N 2/23*    (2006.01)
(52) U.S. Cl. ............................ 297/362.14; 297/362.12
(58) Field of Classification Search ........... 297/362.12, 297/362.14
See application file for complete search history.

(56) References Cited

U.S. PATENT DOCUMENTS

| | | | |
|---|---|---|---|
| 3,127,788 A | 4/1964 | Martens | |
| 3,350,135 A | 10/1967 | Martens | |
| 3,356,411 A * | 12/1967 | Homier et al. | ......... 297/362.12 |
| 3,383,135 A | 5/1968 | Posh | |
| 3,398,986 A | 8/1968 | Homier | |
| 3,424,492 A * | 1/1969 | Tabor | ................ 297/362.14 X |
| 3,479,890 A | 11/1969 | Howell | |
| 3,589,209 A | 6/1971 | Howell | |
| 4,387,926 A | 6/1983 | Van Eerden et al. | |
| 4,770,465 A | 9/1988 | Wiers | |

(Continued)

FOREIGN PATENT DOCUMENTS

EP    0 884 213 A2    12/1998

(Continued)

OTHER PUBLICATIONS

P.L.Porter, "Hydraulic Positioning Products—Repairable", P.L. Porter Controls, Inc., http://www.plporter.com/home/ie/hydrolok_001.html, Jan. 10, 2002.

(Continued)

*Primary Examiner*—Rodney B. White
(74) *Attorney, Agent, or Firm*—Lerner, David, Littenberg, Krumholz & Mentlik, LLP

(57) ABSTRACT

A device for locking and unlocking the position of a moving part of a seat such as a seat on an airplane or other vehicle is disclosed. The device includes a screw and nut assembly with a clamping element. The clamping element allows movement of the moving part of the seat when the clamping element is released and holds the moving part of the seat in position when engaged.

10 Claims, 2 Drawing Sheets

U.S. PATENT DOCUMENTS

| | | | | |
|---|---|---|---|---|
| 4,805,961 | A | * | 2/1989 | Garrod .................. 297/362.14 |
| 4,881,775 | A | * | 11/1989 | Rees ..................... 297/362.14 |
| 5,005,677 | A | | 4/1991 | Bucholtz et al. |
| 5,052,752 | A | * | 10/1991 | Robinson ............... 297/362.14 |
| 5,203,608 | A | | 4/1993 | Tame |
| 5,280,999 | A | | 1/1994 | Jones et al. |
| 5,292,853 | A | | 3/1994 | Yasuda et al. |
| 5,299,853 | A | * | 4/1994 | Griswold et al. ...... 297/362.12 |
| 5,320,413 | A | * | 6/1994 | Griswold et al. ...... 297/362.12 |
| 5,393,123 | A | * | 2/1995 | Hernandez et al. . 297/362.14 X |
| 5,462,332 | A | | 10/1995 | Payne et al. |
| 5,582,461 | A | | 12/1996 | Pickles |
| 5,597,205 | A | | 1/1997 | Glance et al. |
| 5,660,440 | A | * | 8/1997 | Pejathaya .............. 297/362.12 |
| 5,707,112 | A | * | 1/1998 | Zinn .................. 297/362.14 X |
| 5,718,482 | A | * | 2/1998 | Robinson .......... 297/362.12 X |
| 5,769,493 | A | * | 6/1998 | Pejathaya .............. 297/362.12 |
| 5,816,555 | A | | 10/1998 | Ito et al. |
| 5,871,259 | A | * | 2/1999 | Gehart ................. 297/362.12 |
| 5,918,939 | A | * | 7/1999 | Magadanz ......... 297/362.14 X |
| 5,947,560 | A | * | 9/1999 | Chen ..................... 297/362.12 |
| 5,979,986 | A | * | 11/1999 | Pejathaya .............. 297/362.12 |
| 6,017,090 | A | * | 1/2000 | Bonk .................... 297/362.12 |
| 6,045,189 | A | | 4/2000 | Schooler |
| 6,279,995 | B1 | * | 8/2001 | Nakamura et al. ..... 297/362.12 |
| 6,315,361 | B1 | * | 11/2001 | Stone et al. ........... 297/362.12 |
| 6,568,758 | B1 | * | 5/2003 | Berg et al. ............. 297/362.12 |
| 6,761,408 | B2 | * | 7/2004 | Lim et al. .............. 297/362.12 |
| 7,165,812 | B2 | * | 1/2007 | Collins .................. 297/362.12 |

FOREIGN PATENT DOCUMENTS

| | | |
|---|---|---|
| FR | 2 605 075 A1 | 4/1988 |
| FR | 2 711 951 A1 | 5/1995 |
| FR | 2 749 053 A1 | 11/1997 |
| WO | WO-98/27365 A | 6/1998 |

OTHER PUBLICATIONS

P.L. Porter, "Mechanical Positioning Products", P.L.Porter Controls, Inc., http://www.plporter.com/home/ie/mechlok_001.html, Jan. 10, 2002.

* cited by examiner

DEVICE FOR LOCKING THE CONFIGURATION OF EQUIPMENT SUCH AS A VEHICLE SEAT

The invention relates to devices for locking the configuration of equipment such as a vehicle seat.

The document U.S. Pat. No. 3,398,986 discloses a device of this kind which enables the position of the back of a vehicle seat to be adjusted with respect to the seat portion. The device comprises a reversible screw and nut system whose screw is connected to the seat. Two sets of interleaved plates can be connected to the seat portion and to the whole seat respectively and are clamped together by a spring.

To incline the seat back toward the rear, the user operates an external unlocking member which allows the nut to rotate together with all the plates. When the desired position is reached, the user releases the unlocking member, which locks the seat back in position. To raise the seat back again, the user can move it directly: this action pushes the nut against the spring and thus releases the plates. The two sets of plates can then rotate with respect to each other. When the desired position is reached, the spring again clamps the plates, thus locking the seat back in position. This change of position is thus achieved simply by moving the seat back, without any action on the unlocking member.

The use of this system of interleaved friction plates has the advantage of allowing the seat back to be locked in position by means of a relatively weak spring force.

However, the device according to the cited document has the drawback that it only releases the plates when the seat back is raised. In fact, the user has to move the external unlocking member, as mentioned above, in order to lower the seat back toward the rear. The advantages of the plate system are therefore insufficiently exploited. Furthermore, the whole mechanism is relatively complicated and cumbersome. In particular, the unlocking member has to be positioned on the side, so that it occupies a large volume which may be incompatible with the space available in the vehicle passenger compartment or cabin.

One object of the invention is therefore to provide a device enabling a greater benefit to be obtained from the system of friction elements, which is arranged in a simpler and therefore less cumbersome way.

To achieve this object, according to the invention a device is proposed for locking equipment such as a seat, comprising a support and a moving part, the device comprising:

at least three elements movable with respect to each other and connected respectively to the support and to the moving part with spatial alternation;

means for clamping the elements to prevent movement of the moving part with respect to the support; and an unlocking member to allow movement, the unlocking member being operable independently of the moving part, the unlocking member being designed to cancel the clamping provided by the clamping means.

Thus, the operation of the unlocking member makes it possible to cancel the clamping of the elements so that the moving part can be moved in both directions of movement as desired. The advantages of the system of friction elements are therefore exploited in the two possible directions of movement. Furthermore, the invention enables the unlocking member to be housed, if necessary, coaxially with respect to the main axis of the device, or within this axis, in such a way that the invention enables the device to be made with smaller overall dimensions, compatible with the space available in a vehicle passenger compartment or cabin.

The device according to the invention can also have at least any one of the following characteristics:

it has a screw and a nut forming a reversible screw and nut assembly, one member of the screw and nut assembly being fixed with respect to rotation to at least one of the elements, while the other member of the screw and nut assembly is fixed with respect to rotation to the support;

the screw and nut assembly is interposed between the unlocking member and the moving part in order to transmit movement from one to the other;

the unlocking member extends in a main axis of the device;

it comprises a shaft to which at least one of the elements is fixed with respect to rotation, the unlocking member extending in a cavity of the shaft, coaxially with the shaft;

the unlocking member projects at an axial end of the shaft;

it comprises a casing, at least one of the moving elements being fixed with respect to rotation to the casing by having a shape complementary to that of the casing;

there are at least four elements, at least two of the elements being connected to the moving part and at least two other ones of the elements being connected to the support;

the elements are plates;

it comprises means for returning the moving part, designed to push the moving part in a predetermined direction;

the clamping means comprise a spring;

the equipment is a vehicle seat, particularly an aircraft seat; and the moving part is a seat back.

Other characteristics and advantages of the invention are made clear in the following description of a preferred embodiment, provided by way of example and without restrictive intent, with reference to the attached drawings, in which.

The present invention relates to mechanical devices for locking or unlocking the position of a moving part of an armchair or an articulated bed. The device is operated by means of an external unlocking command as described below.

The invention is applicable to all fields in which use is made of a bed or a seat whose elements can be positioned according to the requirements or comfort of the user. In particular, it is applicable to seats of vehicles such as aircraft, ships or trains, regardless of whether the seats are for drivers or pilots or passengers. It is equally applicable to domestic chairs and to beds such as hospital beds. It is also applicable to furniture having moving parts, such as doors, hatches, etc. More generally, the invention is applicable in any other field in which a linear movement is to be locked.

Figure 1:
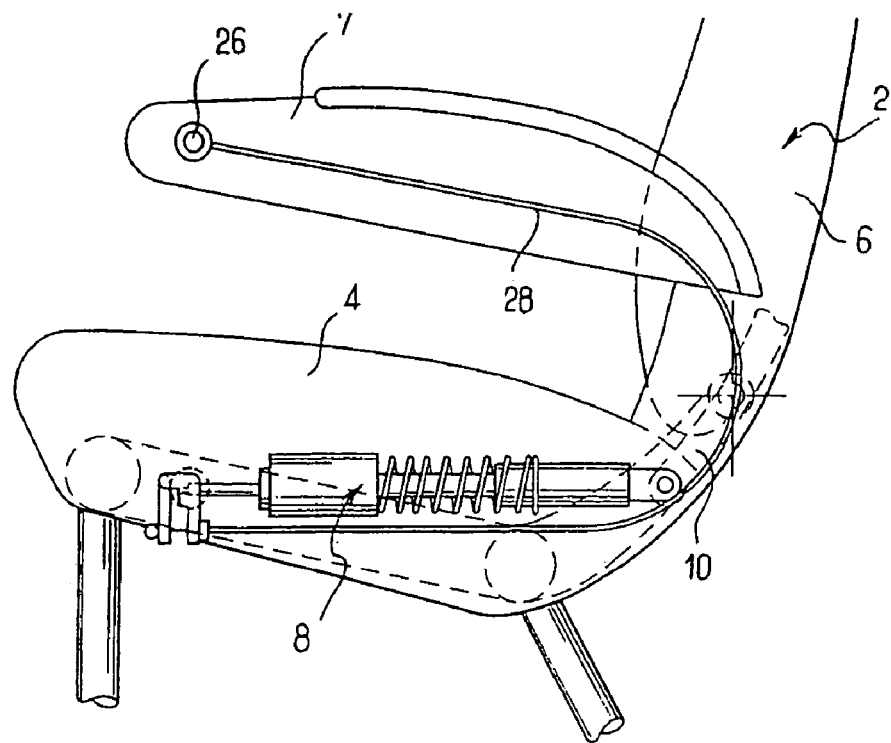
FIG. 1 is a partial side view of a vehicle seat incorporating a locking device according to the invention.

In the present embodiment, the seat 2 shown in FIG. 1 is a passenger seat for aircraft. The seat comprises a seat portion 4 designed to be fixed rigidly to a floor of the vehicle. The seat also comprises a back 6 movable by rotation with respect to the seat portion 4 about an axis which is horizontal and parallel to the floor, and perpendicular to the plane of the sheet on which FIG. 1 appears.

Because of this articulation, the back 2 can be inclined toward the rear in a known way. Finally, the seat comprises an armrest 7 connected to the seat portion 4.

The seat is provided with a device 8 according to the invention enabling the user to lock the position of the back 6 with respect to the support 4. The device 8 is fixed by its front end, in other words its left-hand end as seen in FIG. 1, to the support 4. It is fixed by its rear end, in other words its right-hand end as seen in FIG. 1, to one of a link 10 which is pivoted at another of its ends on the back 6 in such a way that the movement of the back is linked to the movement of the moving parts of the device, as described below. Consequently, when the device 8 locks the position of the back 6, the latter cannot leave its position. On the other hand, when the device unlocks the position, the back 6 can be inclined toward the front or toward the rear as desired by the user.

Figure 2:
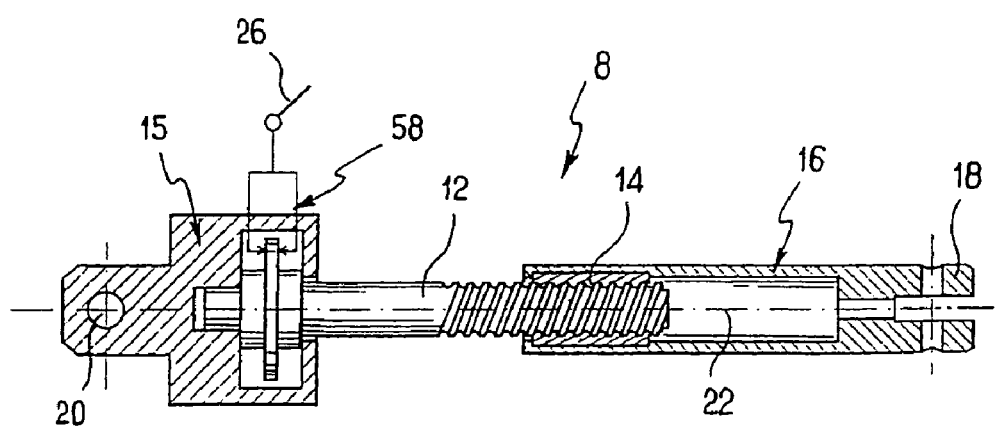
FIG. 2 is a schematic view in longitudinal axial section of the locking device of FIG. 1, showing its operating principle.
Figure 3:
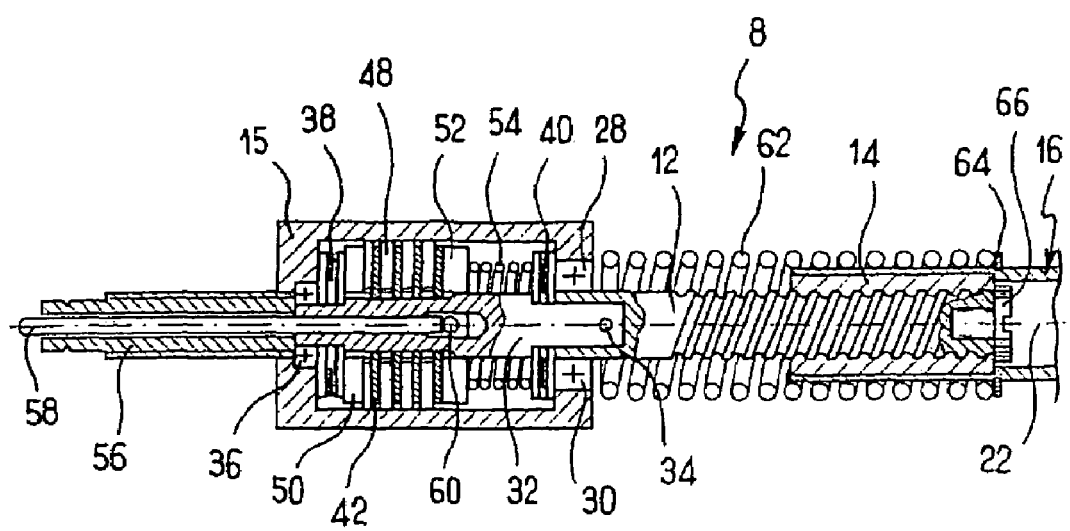
FIG. 3 is a detailed view in longitudinal axial section of the locking device of FIG. 1.

FIG. 2 is a schematic diagram of the device 8 which is illustrated more fully in FIG. 3. The device comprises a screw 12 formed by a shaft threaded on its right-hand half as seen in FIG. 2. It also comprises a nut 14 forming a reversible screw and nut system with the screw 12. The nut 14 is fixed with respect to rotation to the seat portion 4 and is fixed to a connecting part 16. This part is elongate and its front end has a cylindrical cavity which rigidly receives the nut 14 as well as the threaded part of the screw 12 engaged in the nut. The rear end 18 of the connecting part 16 is pivoted by means of a strap on the aforesaid link 10. The device comprises a second connecting part 15 receiving a front end of the screw 12. This end is mounted in a cavity of the connecting part 15 so as to be rotatable with respect to this part while being immobilized in translation with respect to it. Thus no axial movement of the screw 12 in the part 15 is allowed. The second connecting part 15 is pivoted suitably at its front end 20 on the seat portion 4 about an axis perpendicular to the plane of FIG. 2. The screw 12, the nut 14 and the two connecting parts 15 and 16 are coaxial about the axis 22, this axis forming the longitudinal direction of the device.

As a result of this arrangement, the first connecting part 16 can only have one translational movement with respect to the second connecting part 15. In response to a force exerted in the axial direction 22 on the first connecting part 16, and in the direction of this force, the screw 12 tends to be screwed into or out of the nut 14, thus causing the screw 12 to rotate in the second connecting part 15 and thus causing the first connecting part 16 to be translated with respect to the second connecting part 15.

The device can immobilize the screw 12 with respect to rotation, thus preventing the translation of the first connecting part 16. The device comprises an unlocking member 58, operated for example by means of an operating button 26 located in the armrest 7 and operable by the occupant of the seat. If the user does not operate the button 26, the unlocking member 58 immobilizes the screw 12, which is thus unable to move in the nut 14. The movement of the first connecting part 16 and of the back 6 is consequently prevented.

The occupant's action on the button 26 is transmitted by means of a cable 28 extending in the armrest 7 to the unlocking member 58 which immobilizes the screw 12, in order to terminate this immobilization. When the user operates the button 26, the unlocking member 58 permits the rotation of the screw 12 which can therefore move freely in the nut in either direction. The user can therefore incline the back 6 as desired. As described below, this movement can also be produced simply by means of a return spring.

The release of the button 26 locks the position of the back 6 once again, by immobilizing the screw 12 with respect to rotation. When the user releases the button 26, the member 58 again prevents the rotation of the screw 12, thus fixing the position of the connecting part 16 and of the back 6.

The composition of the device 8 will now be described in greater detail with reference to FIGS. 3 to 5.

The locking device 8 comprises a casing 15 in the shape of a rectangular parallelepiped and having an internal cavity of similar shape. The casing has a rear axial aperture 28 occupied by a bearing 30. A front end of the screw 12 is housed in this bearing. The device comprises a shaft 32 having an axis 22, the rear end of the shaft being housed in a forward cavity of the screw 12 and being immobilized in the latter by means of a pin 34 extending perpendicularly to the axis 22 and cutting this axis. The screw 12 and the shaft 32 are therefore fixed rigidly to each other.

The shaft 32 extends along the axis 22 through the casing 15 so that its front end occupies a forward aperture of the casing with the interposition of a bearing 36. At its two ends, the shaft 32 has an outer diameter which is reduced with respect to the diameter of a median portion of the shaft. The device comprises two stops 38 and 40 of circular shape, each having a central aperture, threaded onto the front and rear portions respectively of the shaft 32. Each stop therefore bears on a corresponding shoulder delimiting the median portion of the shaft 32 and on a corresponding axial end face of the casing 15. As a result of this assembly, the shaft 32 and the screw 12 are rotatable with respect to the casing 15 about the axis 22 but are immobilized in translation with respect to this casing.

The bearings 30 and 36 and the stops 38 and 40 can be plain, or can be made from sintered material, or in the form of ball bearings, needle bearings, or the like.

Figure 4:
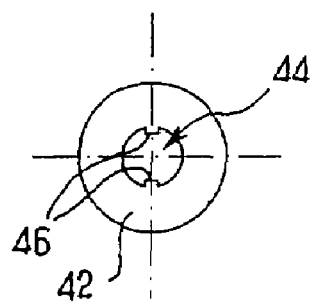
FIGS. 4 and 5 are views in elevation of two types of plates included in the device of FIG. 3.
Figure 5:
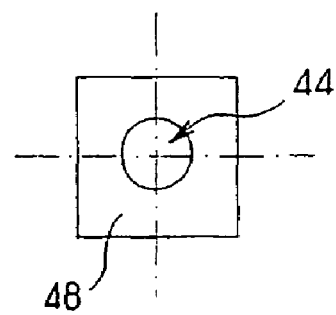

The device 8 comprises two sets of friction plates shown in FIGS. 3 to 5. The plates 42 of the first set, shown in FIG. 4, are disk-shaped with a central circular aperture 44. There are four of these plates in the present example. However, this number could be increased or decreased. Each plate 42 has two lugs 46 projecting radially into the aperture 44 from an edge of this aperture. Each lug has a generally rectangular shape and extends in the plane of the plate. The shaft 32 has two rectilinear longitudinal grooves extending parallel to the axis 22 on the outer face of the shaft and diametrically opposite each other on either side of this axis. Each of these grooves can receive one of the lugs 46 when the plates 42 are threaded onto the shaft 32. In this position, each plate extends in a plane perpendicular to the axis 22, the plates being parallel to each other. As a result of this arrangement, the plates 42 are movable in translation along the shaft 32 and inside the casing 15. However, they are fixed with respect to rotation to the shaft 32. They therefore accompany the latter in its movement when it rotates inside the casing 15.

The plates 48 of the second set, shown in FIG. 4, have a generally rectangular shape, or more precisely a square shape in the present example. Each of them has a central circular aperture 44. The outer profile of these plates matches the shape of the cavity of the casing 15 in a plane perpendicular to the axis 22. The plates 48 can therefore be received in the casing 15 by being threaded onto the shaft 32 and extending parallel to each other and perpendicularly to the axis 22. As a result of the complementary shapes of the plates 48 and the cavity of the casing 15, the plates are immobilized in rotation with respect to the casing about the axis 22 by the complementarity or interaction of their shapes, but are free to slide along this axis. The number of plates 48 of the second set is also four, but this number could also be changed, particularly to match the number of plates in the first set.

The plates 42 and 48 of the two sets alternate spatially, in other words along the axis 22, in such a way that all the plates are parallel to each other and perpendicular to the axis 22. The plates of the two sets are in contact with each other, by making surface contact.

Clearly, various means can be provided to immobilize the plates of the first set in rotation with respect to the shaft and to immobilize the plates of the second set in rotation with respect to the casing. In particular, splines, channels, flats or any other shape can be used to permit this immobilization in rotation while allowing relative movement along the axis 22.

The device also comprises two rings 50 and 52, each threaded onto the shaft 32 and interposed, respectively, between the front stop 38 and the first plate 42, and between the last plate 48 and the rear stop 40.

The device comprises a return spring 54 interposed axially between the rear ring 52 and the rear stop 40 and having its ends bearing on these components. This spring 54 presses the plates 42 and 48 of the two sets against each other so as to clamp them when the unlocking member 58 is not operated. In these conditions, at rest, the frictional torque between the plates opposes the rotation of the shaft 32 and the screw with respect to the casing 15, thus immobilizing the back 6 in its position.

The casing 15 is extended forward from its aperture by an arm 56 which is, for example, fixed rigidly in this aperture by means of a screw and nut joint. The unlocking member comprises a pusher 58 having a rod extending inside the arm 56, in a cavity of the latter, coaxially with the arm and along the axis 22. A pin 60 extending transversely with respect to the axis 22 and cutting the latter extends in an opening of the shaft 32 and passes through two radial apertures of the rear ring 52. A rear end of the pusher 58 bears on this pin, a front end of the pusher also projecting at the front end of the arm 56. The pusher 58 can slide along the axis 22 with respect to the arm 56 to push the pin 60 toward the rear. The user makes the pusher 58 slide toward the rear by operating the button 26, with the aid of the cable 28 and by means of a known arrangement which is not described in detail here.

As long as the pusher 58 is not operated, the spring 54 presses the two sets of plates against each other in such a way that the frictional torque thus generated prevents the rotation of the plates 42 of the first set and of the screw 12. The device 8 then prevents any movement of the back 6 of the armchair which is thus locked in its position.

When the user presses the button 26, the backward movement of the pusher 58 pushes the rear ring 52 toward the rear, thereby compressing the spring 54 and releasing its pressure on the two sets of plates. The frictional torque between the plates then decreases greatly and ceases to oppose the rotation of the screw 12 which can thus move in the nut 14. The user can then move the seat back 6, by pushing it with his back for example, to the desired position in the forward or rearward direction, any position being obtainable.

When the user releases the button 26, the spring 54 returns the whole assembly consisting of the rear ring 52 and the pusher 58 toward the front, and clamps the plates again. The screw is then immobilized in position again, together with the back 6.

It should be noted that the device can be unlocked while under load and regardless of the size of this load. The path of the pusher 58 can be very short, since it is sufficient to cancel the pressure of the spring 54 in order to allow the plates to rotate with respect to each other without necessarily releasing them completely from each other.

The device comprises another return spring 62 interposed axially between the rear end face of the casing 15 and an elastic ring 64 fitted in an outer annular groove formed on the first connecting part 16, this spring bearing axially on these components. The spring therefore exerts a force tending to move the first connecting part 16 away from the second connecting part 15. This spring is designed to have sufficient stiffness to push the seat back 6 to its limit position, for example the highest position, when the user unlocks the device while ceasing to push on the seat back or while pushing moderately on it. This return spring enables the seat back to accompany the user's back at all times when he wishes to raise it by operating the button 26, thus limiting the force required from the user.

In the present example, a rear end of the screw 12 has a tap receiving a screw 66 whose head diameter is greater than the overall diameter of the rear part of the screw 12, thus enabling the screw 66 to bear axially on the rear end of the nut 14. The screw 66 forms a stop screw which fixes the limit position of the seat back 6. This position is determined, in particular, by the length of the threaded part of the screw 12.

The plates 42 and 48 can be formed from various materials which provide a maximum coefficient of friction, with low wear and without any tendency to adhere to each other. The number of the plates depends on the desired braking torque.

It should be noted that the device according to the invention can be used to lock the seat back 6 in an unlimited number of positions and in any position between the two limits of travel of the seat back.

Clearly, numerous modifications can be made to the invention without departure from the scope thereof as defined by the attached claims. The screw 12 can be made in the form of a ball screw. In a variant embodiment, the elements 42 and 48 can have a shape which is not flat, for example a corrugated shape.

The invention claimed is:

1. A device for locking the configuration of equipment, the equipment having a support and a moving part, the device comprising:
    at least three plates, said plates being movable with respect to each other and said plates being connected respectively to the support and to the moving part, wherein the plates alternate spatially;
    a screw and a nut forming a reversible screw and nut assembly, one member of the screw and nut assembly being fixed with respect to rotation to at least one of the plates connected to the moving part, while a second member of the screw and nut assembly is fixed with respect to rotation to the support;
    means for clamping the plates to prevent a movement of the moving part with respect to the support; and
    an unlocking member to allow movement, wherein the unlocking member is operable independently of the moving part, the unlocking member is designed to cancel the clamping provided by the clamping means, and the unlocking member extends in a main axis of the device.

2. The device according to claim 1, wherein the screw and nut assembly is interposed between the unlocking member and the moving part in order to transmit movements from one to the other.

3. The device according to claim 1, further comprising a shaft to which at least one of the elements is fixed with respect to rotation, the unlocking member extending in a cavity of the shaft, coaxially with the shaft.

4. The device according to claim 3, characterized in that the unlocking member projects at an axial end of the shaft.

5. The device according to claim 1, further comprising a casing, wherein at least one of the moving plates is fixed with respect to rotation of the casing by having a shape complementary to that of the casing.

6. The device according to claim 1, wherein there are at least four plates, at least two of the plates being connected to the moving part and at least two other ones of the plates being connected to the support.

7. The device according to any claim 1, further comprising means for returning the moving part, said means being designed to push the moving part in a predetermined direction.

8. The device according to claim 1, wherein the clamping means comprises a spring.

9. The device according to any one of the preceding claims, wherein the equipment is a vehicle seat, particularly an aircraft seat.

10. The device according to claim 1, wherein the moving part is a seat back.

* * * * *